United States Patent [19]
Granata et al.

[11] Patent Number: 6,009,307
[45] Date of Patent: Dec. 28, 1999

[54] MULTIPLE ANTENNA DETECTING AND SELECTING

[75] Inventors: Gary Granata, San Diego; James H. Thompson, Carlsbad, both of Calif.

[73] Assignee: QUALCOMM Incorporated, San Diego, Calif.

[21] Appl. No.: 08/855,242

[22] Filed: May 13, 1997

[51] Int. Cl.$^6$ ....................................................... H04Q 7/20
[52] U.S. Cl. ........................ 455/13.3; 455/132; 455/134
[58] Field of Search .................................... 455/132, 133, 455/134, 135, 136, 137, 138, 140, 141, 272, 273, 276.1, 277.1, 277.2, 278.1, 279.1; 475/347, 349

[56] References Cited

U.S. PATENT DOCUMENTS

| | | | |
|---|---|---|---|
| 4,052,670 | 10/1977 | Watanabe et al. | 325/4 |
| 4,218,654 | 8/1980 | Ogawa et al. | 370/97 |
| 5,161,252 | 11/1992 | Higuchi et al. | 455/78 |
| 5,303,396 | 4/1994 | Ooyagi et al. | 455/277.2 X |
| 5,499,272 | 3/1996 | Bottomley | 375/347 |
| 5,657,572 | 8/1997 | Scilling | 375/349 |
| 5,663,990 | 9/1997 | Bolgiano et al. | 375/347 |
| 5,777,693 | 7/1998 | Kishigami et al. | 455/277.2 X |
| 5,818,543 | 10/1998 | Lee | 455/277.1 X |

FOREIGN PATENT DOCUMENTS

| | | | |
|---|---|---|---|
| 2272604 | 5/1994 | United Kingdom | H04B 17/00 |

*Primary Examiner*—Wellington Chin
*Assistant Examiner*—Yemane Woldetatios
*Attorney, Agent, or Firm*—Russell B. Miller; Gregory D. Ogrod

[57] ABSTRACT

A system and method for selecting and combining satellite communication signals from multiple antennas. The system includes at least two signal paths, each coupled to a separate antenna, and a combiner for combining signals from the two paths for processing by a signal processor. At least one of the two paths includes a signal delay unit. The signal processor can distinguish a signal received from a source on one of the antennas from that signal received from the source on the other antenna based on a signal delay produced by the signal delay unit. Each signal path includes a variable attenuator for selectively coupling each signal path to the signal processor. The signal processor determines the quality of the signals received along the signal paths, and provides data regarding signal quality to a control processor, which manipulates the attenuators to couple the signal path having the highest quality signal to the signal processor.

22 Claims, 7 Drawing Sheets

MULTIPLE ANTENNA DETECTING AND SELECTING

BACKGROUND OF THE INVENTION

I. Field of the Invention

The present invention relates generally to satellite communication systems and more particularly to detecting and selecting satellite communication signals using multiple antennas.

II. Description of the Related Art

A variety of multiple access communication systems and techniques have been developed for transferring information among a large number of system users. However, spread spectrum modulation techniques, such as those used in code division multiple access (CDMA) communication systems provide significant advantages over other modulation schemes, for example, especially when providing service for a large number of communication system users. Such techniques are disclosed in the teachings of U.S. Pat. No. 4,901,307, which issued Feb. 13, 1990 under the title *Spread Spectrum Multiple Access Communication System Using Satellite or Terrestrial Repeaters*, and U.S. patent application Ser. No. 08/368,570, filed under the title *Method and Apparatus for Using Full Spectrum Transmitted Power in a Spread Spectrum Communication System for Tracking Individual Recipient Phase Time and Energy*, both of which are assigned to the assignee of the present invention and incorporated herein by reference.

The above-mentioned patents disclose multiple access communication systems in which a large number of generally mobile or remote system users each employ at least one transceiver to communicate with other system users or users of other connected systems, such as a public telephone switching network. The transceivers, also referred to as user terminals, can communicate through gateways and satellites, or terrestrial base stations (also sometimes referred to as cell-sites) or other relay terminals.

Base stations cover regions (also sometimes referred to as cells), while satellites have footprints on the surface of the Earth. In either system, capacity gains can be achieved by sectoring, or subdividing, the geographical regions being covered. Cells can be divided into "sectors" by using directional antennas at the base station. Similarly, a satellite's footprint can be divided geographically into "beams," through the use of beam-forming antenna systems. These techniques for subdividing a coverage region can be thought of as creating isolation using relative antenna directionality or space division multiplexing. In addition, provided there is available bandwidth, each of these subdivisions, either sectors or beams, can be channelized. One way to channelize these subdivisions is to assign multiple CDMA channels through the use of frequency division multiplexing (FDM). In satellite systems, each CDMA channel is referred to as a "sub-beam," because there may be several of these per "beam."

In communication systems employing CDMA, separate links are used to transmit communication signals to and from a gateway or base station. A forward link refers to communication signals originating at the gateway or base station and transmitted to a system user. A reverse link refers to communication signals originating at a user terminal and transmitted to the gateway or base station.

In one type of spread-spectrum communication system, one or more preselected pseudo-noise (PN) code sequences are used to modulate or "spread" user information signals over a predetermined spectral band prior to modulation onto a carrier for transmission as communication signals. PN spreading, a method of spread-spectrum transmission that is well known in the art, produces a signal for transmission that has a bandwidth much greater than that of the data signal. In the base station- or gateway-to-user terminal communication link, PN spreading codes or binary sequences are used to discriminate between signals transmitted by different base stations or over different beams. These codes are typically shared by all communication signals within a given cell or sub-beam.

A pair of pseudonoise (PN) code sequences can be used to modulate or "spread" information signals. Typically, one PN code sequence is used to modulate an in-phase (I) channel while the other PN code sequence is used to modulate a quadrature-phase (Q) channel. This PN modulation or encoding occurs before the information signals are modulated by a carrier signal and transmitted as communication signals. The PN spreading codes are also referred to as short PN codes because they are relatively "short" when compared with other PN codes used by a communication system.

A common goal in the design of such multiple-access communications systems is to achieve the highest possible user capacity, that is, to enable the largest possible number of users to access the system simultaneously. System capacity can be limited by several factors, such as the number of user codes and CDMA channels available. However, spread spectrum systems are "power limited", that is by the total amount of power allowed by all users to prevent unacceptable interference, and generally it is the amount of power required to maintain forward link communications to system users that limits system capacity the most. If the amount of power required to maintain just a few of these links is large enough, the total power allocation is consumed well before the number of codes or frequencies available for more users are exhausted.

Therefore, it is generally necessary to minimize the power required to "connect" each user or maintain their forward link in order to leave power for other users and increase system capacity. This can be accomplished by increasing the ratio G/T of antenna gain G to receiver noise temperature T for each user. The higher this ratio or the antenna gain for each user, the less power required by that user for a link. When the gain of each user antenna is high then a sufficiently low amount of power is required to maintain the forward link and power is available for others.

In satellite communication systems, another design goal is to track or acquire and communicate with multiple satellites simultaneously. One reason behind this goal is the desire to improve signal reception using signal diversity. Another reason is to accommodate communications with satellites which are in range, or in view, for relatively short periods of time. A common approach to achieving these goals is to optimize antenna design.

One such design optimization is to utilize large, steerable, highly directional antennas. Another such design optimization is to combine the signals of multiple antennas to form a steerable beam. One disadvantage of these approaches is that the manufacture and integration of such antennas is both complex and expensive.

Another such design optimization is to use multiple antennas, such as "patch" or helical antenna elements, that each cover a different sector of the sky. That is, each antenna has a radiation pattern that is optimized to cover a specific region of the sky or of a satellite constellation orbital pattern.

This results in increased directivity and increased gain or G/T per antenna. A significant advantage of this approach is that less expensive antennas can be used. Unfortunately, the primary barrier to the use of multiple inexpensive antennas is the difficulty of detecting and selecting the appropriate signals from the antennas.

SUMMARY OF THE INVENTION

The present invention is a system and method for detecting and selecting satellite communication signals from multiple antennas. In one embodiment, the system includes two signal paths, each coupled to a separate antenna, and a combiner for combining signals from the two paths for processing by a signal processor. At least one of the two paths includes a signal delay unit. The signal processor can distinguish a signal received from a source on one of the antennas from that also received from the source on the other antenna, based on a signal delay produced by the signal delay unit.

Each signal path includes a variable attenuator for selectively coupling each signal path to the signal processor. The signal processor determines the quality of the signals received along the signal paths, and provides data regarding signal quality to a control processor. The control processor manipulates the attenuators to couple the signal path having the highest quality signal to the signal processor, and other processing elements.

According to the present invention, one of the signal paths initially is coupled to one of a plurality of antennas and passes data to the signal processor by applying a predetermined minimum attenuation to that signal path's attenuator. This path is referred to as the "data path." The other signal path, referred to as the "search path," is used to examine each of the remaining antennas to determine whether a better signal quality can be received from one of those antennas than from the antenna currently connected to the data path.

To examine a particular antenna, it is coupled through a predetermined amount of delay to the signal processor using a switching mechanism. The delay is disposed in series with the antenna output to the processor, adjacent the antenna output or along the signal path, and allows the processor to distinguish between data and search paths. The signal processor then determines the quality of the signal received along the search path.

The preferred switching process is implemented using an attenuator disposed in the search path to apply a predetermined maximum level of attenuation, thereby effectively decoupling the search path from the signal processor. The search path is then coupled to a particular antenna using a switching mechanism, such as an electronic switch or switchable amplifier stage. The attenuation for the search path attenuator is then reduced until the noise power levels of the search path and data path are substantially equivalent. The signal processor then determines the quality of the signal received along the search path.

This process is repeated for each of the antennas. When some or all of the antennas have been examined, if the quality of the highest-quality signal found by the search path exceeds the quality of the signal on the data path, then the roles of the search path and data path are exchanged. In one embodiment, the attenuation applied by the data path attenuator is increased until the data path signal is effectively decoupled from the signal processor, and the attenuation of the attenuator on the search path is decreased to a predetermined minimum. At this point, the search path and data path have reversed roles and the old search path is now the new data path. The new search path then continues to search for better signals.

BRIEF DESCRIPTION OF THE DRAWINGS

The features, objects, and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

I. Introduction

The present invention is a system and method for selecting and combining satellite communications signals received by multiple antennas in an orbiting satellite communications system such as a low-earth orbit (LEO) satellite communications system. As would be apparent to one skilled in the relevant art, the concept of the present invention can be applied to satellite communications systems in which the satellites travel in non-LEO orbits. In addition, the concept of the present invention can be applied to wireless terrestrial communications systems where the user terminal receives signals from multiple sources which are subject to motion or variation in signal strength.

The preferred embodiment of the present invention is discussed in detail below. While specific steps, configurations, and arrangements are discussed, it should be understood that this is done for illustrative purposes only. A person skilled in the relevant art will recognize that other steps, configurations, and arrangements can be used without departing from the spirit and scope of the present invention.

II. A Typical Satellite Communications System

Figure 1:
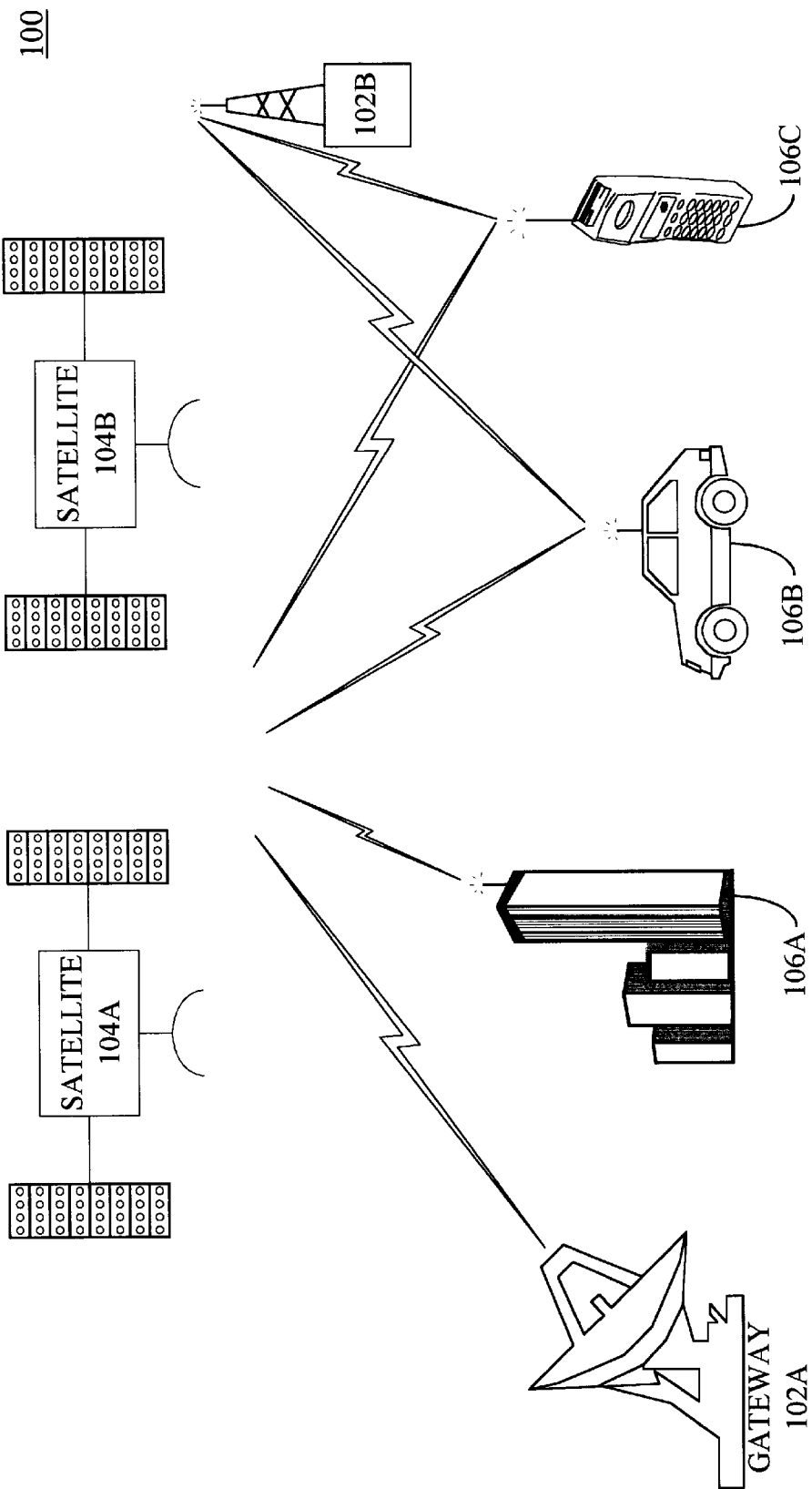
FIG. 1 depicts a typical satellite communication system.

FIG. 1 depicts a typical wireless communication system 100 using satellites and gateways or base stations). In a preferred embodiment, communication system 100 is a CDMA spread spectrum communication system. Wireless communication system 100 comprises one or more gateways 102, satellites 104, and user terminals 106. User terminals 106 each have or comprise a wireless communication device such as, but not limited to, a wireless telephone, although data transfer devices (e.g., portable computers, personal data assistants, modems) are also contemplated. User terminals 106 are generally of three types: fixed user terminals 106A, which are typically mounted in permanent structures; mobile user terminals 106B, which are typically mounted in vehicles; and portable user terminals 106C, which are typically hand-held. User terminals are also sometimes referred to as subscriber units, mobile stations, or simply "users" or "subscribers" in some communication systems, depending on preference.

Gateways 102 (here 102A), also referred to as base stations, hubs, or fixed stations in various systems, communicate with user terminals 106 through satellites 104A and/or 104B. Generally, multiple satellites are employed traversing different orbital planes such as in, but not limited to, Low Earth Orbit (LEO). However, those skilled in the art will readily understand how the present invention is applicable to a variety of satellite system, gateway, or base station configurations. Base stations 102B (also referred to as cell-sites or -stations) could be used in some systems to communicate directly with user terminals 106. Gateways and base stations may also be connected to one or more system controllers which provide them with system-wide control or information, and connect them to a public switched telephone network (PSTN).

Each user terminal 106 employs one or more antennas for signal transmission and reception. In a preferred embodiment, fixed user terminal 106A employs a set of antennas, also referred to as an antenna "farm", each covering a discrete portion of the sky. That is, each antenna has a radiation pattern that is optimized to cover a specific region of the sky or satellite orbits. In a preferred embodiment, the antenna set includes four patch antennas, each covering 90° in azimuth and elevations from a predetermined local horizon of approximately 20°–90°, and one quadrifilar antenna covering 360° in azimuth and elevations from approximately 0° to 25°. In alternative embodiments, cost permitting, multiple antennas can be employed by mobile user terminals 106B and portable user terminals 106C, although this is less likely due to the size and resources generally required.

As a satellite crosses the sky, it traverses coverage regions for more than one of the antennas in the set. In order to meet high G/T requirements and optimize received signal quality, fixed user terminal 106A should determine which of the multiple antennas is receiving the highest-quality signal from the satellite at any given instant. That antenna is then used for communication links with the satellite. The present invention provides several solutions to this problem.

For purposes of illustration, the present invention is described in terms of a satellite communications system. As mentioned above, the present invention can be applied to other types of communications systems, as would be apparent to one skilled in the relevant art after reading this description.

III. Single Intelligent Receiver

Figure 2A:
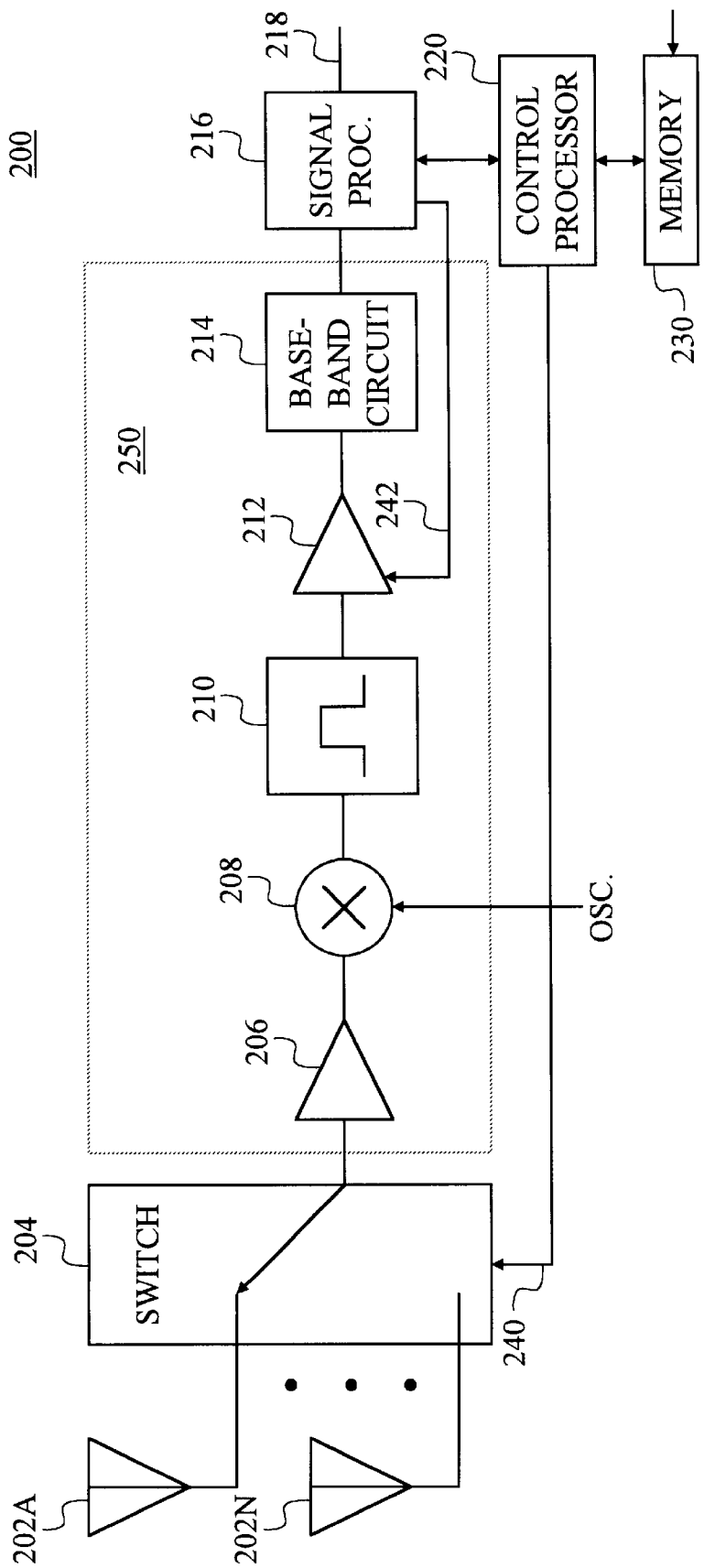
FIGS. 2A and 2B depict exemplary single receiver systems suitable for implementing one embodiment of the present invention.

FIG. 2A depicts an exemplary single receiver system 200 suitable for implementing one embodiment of the present invention. System 200 includes a plurality of antennas 202A through 202N, which are selectively coupled by a switch or switching device 204 to a single signal path 250. Signal path 250 includes an amplifier stage, preferably a low-noise amplifier (LNA) 206, a mixer 208, a bandpass filter 210, an automatic gain control (AGC) amplifier 212, and a baseband circuit 214. In a preferred embodiment, baseband circuit 214 is generally implemented as an application-specific integrated circuit. Signal path 250 is coupled to a signal processor 216. In a preferred embodiment, signal processor 216 is implemented as an application-specific integrated circuit. Signal processor 216 is also coupled to a control processor 220, which is in turn coupled to switch 204 by one or more control lines 240. In an alternative embodiment, control processor 220 is incorporated within signal processor 216. Those skilled in the art will readily recognize that signal processor 216 and control processor 220 are elements that can be implemented within a variety of known signal processing circuits used in the user terminal.

In operation, control processor 220 selects a particular antenna 202 and couples that antenna to the signal path by manipulating switch 204. The signal received by the selected antenna is then amplified by LNA 206. The amplified signal is then fed to mixer 208 for combination with a signal provided by a local oscillator (not shown) to reduce the frequency of the signal from radio frequency (RF) to a desired known intermediate frequency (IF). The IF signal is passed to filter 210, which filters the IF signal and passes it to AGC amplifier 212. In one embodiment of the present invention, a bandpass surface acoustic wave (SAW) type filter is used to implement filter 210. Filter 210 may provide phase changes that are substantially linear with changes in frequency.

AGC amplifier 212 adjusts the voltage range of the IF signal to match the input voltage range of baseband circuit 214. In a preferred embodiment, signal processor 216 determines the appropriate level of gain to be applied by AGC amplifier 212 and specifies that level of gain to AGC amplifier 212 using control line 242. In an alternative embodiment, this determination and specification is accomplished by control processor 220. In another embodiment, the level of gain to be applied is based partially or completely on information, such as power control feedback, supplied by gateway 102. In a preferred embodiment, the signal provided over control line 242 is a pulse density modulated (PDM) signal. In another embodiment, the signal provided over control line 242 is an analog signal of variable amplitude. Other variations are possible without departing from the spirit and scope of the present invention, as would be apparent to one skilled in the relevant art.

Baseband circuit 214 may include a downconverter to reduce the frequency of the IF signal to baseband. Baseband circuit 214 also includes an analog-to-digital converter to convert the analog baseband signal to a digital signal, which is fed to signal processor 216. Signal processor 216 despreads and demodulates the digital signal, provides error correction, and the like, using circuit elements known in the art. The output signal 218 from signal processor 216 is a digital data signal. Output signal 218 can be fed to vocoders and the like for further processing, as would be apparent to one skilled in the relevant art. Signal processor 216 is coupled to control processor 220, which selects different antennas 202 by manipulating switch 204 using signals on control line 240.

Figure 2B:
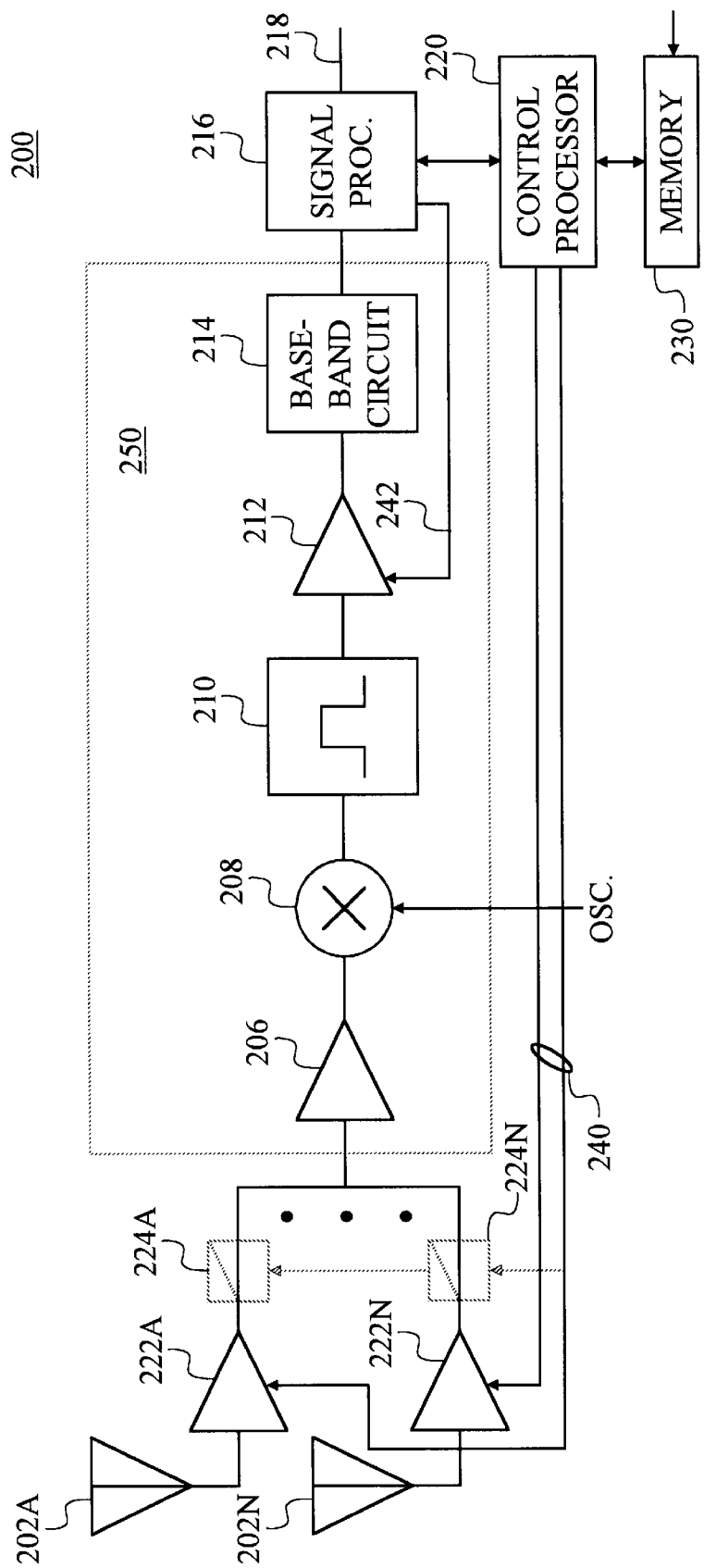

One alternative embodiment of receiver system 200 is depicted in FIG. 2B. In FIG. 2B, switch 204 has been replaced by switchable LNAs 222A through 222N. In this embodiment, control processor 220 selects antennas 202 by manipulating switchable LNAs 222 using one or more control lines 240. In one embodiment, a switchable LNA 222 is switched "off" by removing supply power to the switchable LNA 222, thus, providing no output signal. DC supply power can be provided over the same coaxial cables typically used for RF signal transfer, or using one of many known techniques. In another embodiment, each switchable LNA 222 is coupled to LNA 206 by an output stage 224 (224A–224N), shown by a dashed line. Output stage 224 is switched "off" or has its input switched off, to interrupt transfer of signals, generally using an internal electronic switching element.

Receiver system 200 can be used to implement an intelligent single receiver solution of the present invention. In operation, receiver system 200 uses idle time and/or spare capacity to monitor the passage of satellites 104 in their orbits across the sky. In a preferred embodiment, spare capacity is realized when a communications channel is not being used for communications purposes. Because these passages are regular, receiver system 200 "learns" the schedules of the satellites. Using this information, receiver system 200 builds a database (not shown) detailing the schedules of the satellites and their passages across the fields of view of antennas 202. Based on this information, receiver system 200 selects the antenna that is expected to have the best signal reception from a particular satellite 104 at a particular time. In one embodiment, fixed user terminal 106A is supplied with partial or complete satellite schedule information prior to installation, and refines this information through the "learning" process described above.

Once receiver system 200 has learned a satellite's schedule, control processor 220 activates the proper antenna 202 at the proper time to obtain the best signal from the satellite. However, a change in the coverage pattern of the antennas, antenna blockage, satellite orbits, or the like, can force receiver system 200 to "relearn" the satellite schedules. As will be apparent to those skilled in the art, control processor 220 can use a variety of known storage elements or devices 230, such as RAM, to store the learned or previously known satellite schedule.

IV. Dual Receiver

Another solution is to use a receiver system that includes two or more complete signal paths and two signal processors. In this embodiment, a control processor compares the output signals of the signal processors and uses the signal having the highest quality.

Figure 3:
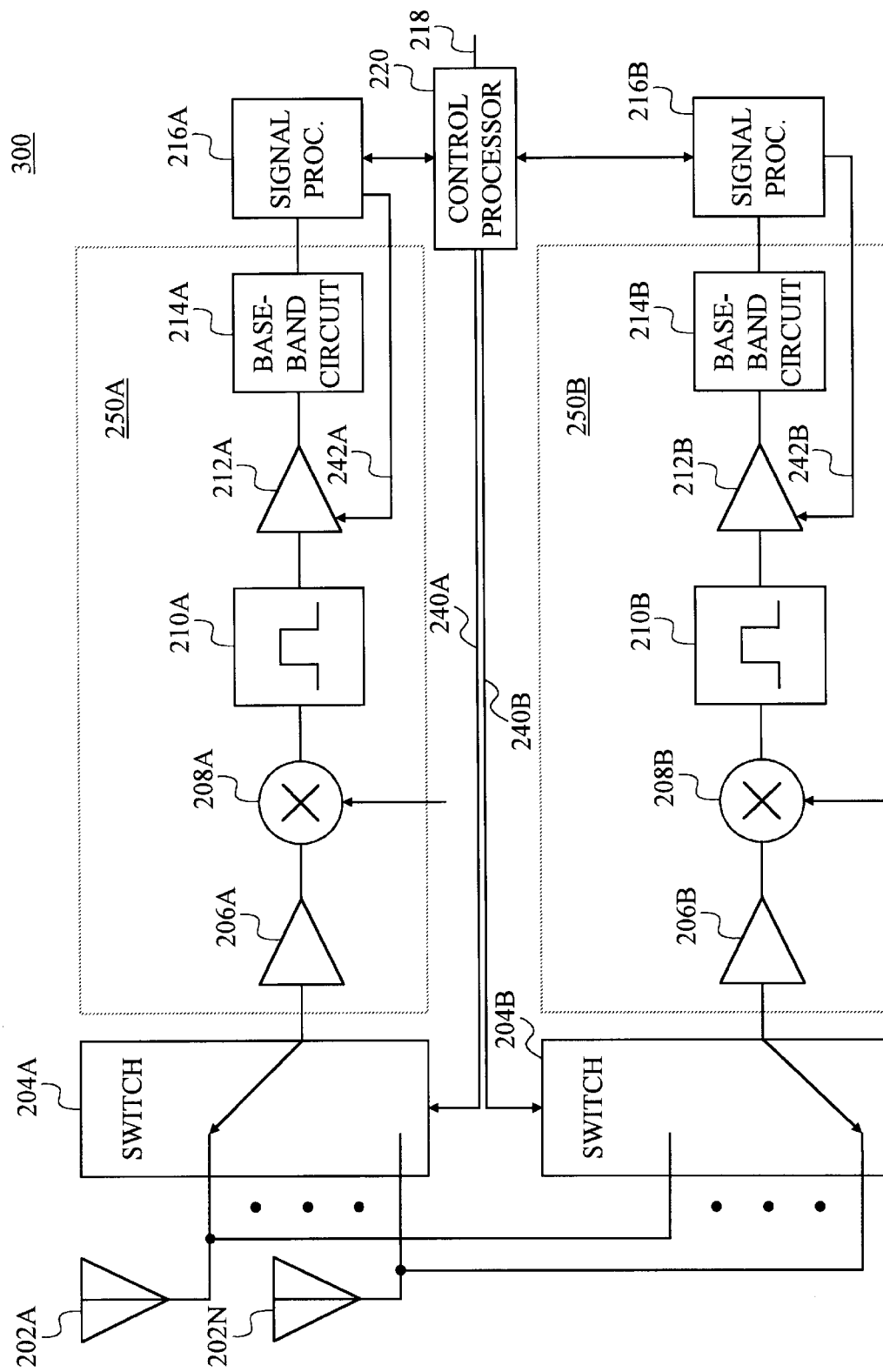
FIG. 3 is a circuit block diagram depicting an exemplary receiver system suitable for implementing a dual receiver solution of the present invention.

FIG. 3 is a circuit block diagram depicting an exemplary receiver system 300 suitable for implementing a dual receiver solution of the present invention. For convenience, FIG. 3 depicts only two signal paths 250A and 250B. Of course, more than two signal paths can be employed without departing from the spirit and scope of the present invention, as would be apparent to one skilled in the relevant art after reading this description.

Referring again to FIG. 3, signal path 250A includes an LNA 206A, a mixer 208A, a bandpass filter 210A, an AGC amplifier 212A, and a baseband circuit 214A. Signal path 250A is coupled to one of a plurality of antennas 202A–202N by a switch or switching device 204A. Similarly, signal path 250B includes an LNA 206B, a mixer 208B, a bandpass filter 210B, an AGC amplifier 212B, and a baseband circuit 214B. Signal path 250B is coupled to one of antennas 202A–202N by a switch 204B. Each signal processor 216 is coupled to a control processor 220.

Switches 204A and 204B can form a single switching device configured to connect multiple inputs to separate outputs at any given time, as would be known. The antennas (204A–204N) used by the search paths are selected using one or more control lines 240 (240A, 240B). Generally, a separate control line 240 (240A, 240B) is used for each switching device 204, unless control commands are multiplexed in some known fashion.

In operation, each signal path 250 assumes a different one of two roles which are labeled as: data path and search path. While one of the signal paths, referred to as the data path, receives data from an antenna 202 (202A–202N) and passes it to a signal processor 216, say 216A, the other signal path, referred to as a search path, receives data from another antenna 202 and passes it to another signal processor 216, say 216B. The outputs of the signal processors 216 (216A, 216B), that is, the signal processor connected to the data path and the signal processor connected to the search path, are constantly monitored by control processor 220 for signal quality.

In a preferred embodiment, signal quality is determined by measuring the energy per chip relative to the background noise level, otherwise known as the ratio $E_C/I_0$. In an embodiment having more than two signal paths, one signal path is employed as a data path and the other signal paths are employed as search paths. Of course, other measures of signal quality such as bit error rate, checksums, and the like can be used by the signal processors or controller for measuring signal quality without departing from the spirit and scope of the present invention, as would be apparent to one skilled in the relevant art.

Initially, one signal path is selected as the data path by control processor 220 to provide output signal 218. When a search path finds an antenna receiving a signal of higher quality than the signal on the data path, control processor 220 selects that search path as the new data path to provide output signal 218, and selects the old data path to become a search path. Thus, the search path is used to continually search for an antenna providing a signal of higher quality than the signal currently being processed on the data path. In one embodiment, when a search path finds a higher-quality signal, then the data path and the search path exchange roles. In another embodiment, some or all of the antennas are evaluated before the data path and the search path exchange roles. The dual receiver solution provides a high degree of performance because the search and signal paths are completely separate.

V. Time Delay Searcher

A lower-cost solution can be achieved by moving the common point (that is, the point where the two signal paths intersect) closer to the antennas. The signals are then combined at RF. When the signals are combined upstream of (that is, closer to the antennas than) the signal processor, the signal processor must be provided with a way to distinguish the combined signals. One approach is referred to herein as the time delay searcher solution. In the time delay searcher solution, a delay is introduced into one or both signal paths so that, after the signals are combined, signals from one antenna may be distinguished from signals from the other antenna based on the signal delay. While different signals using different PN spreading codes can be easily distinguished by a receiver, multiple versions of a signal arriving from a common source (same PN code) but over multiple paths, are generally not distinguishable unless a minimum relative delay in timing between them is achieved.

Figure 4:
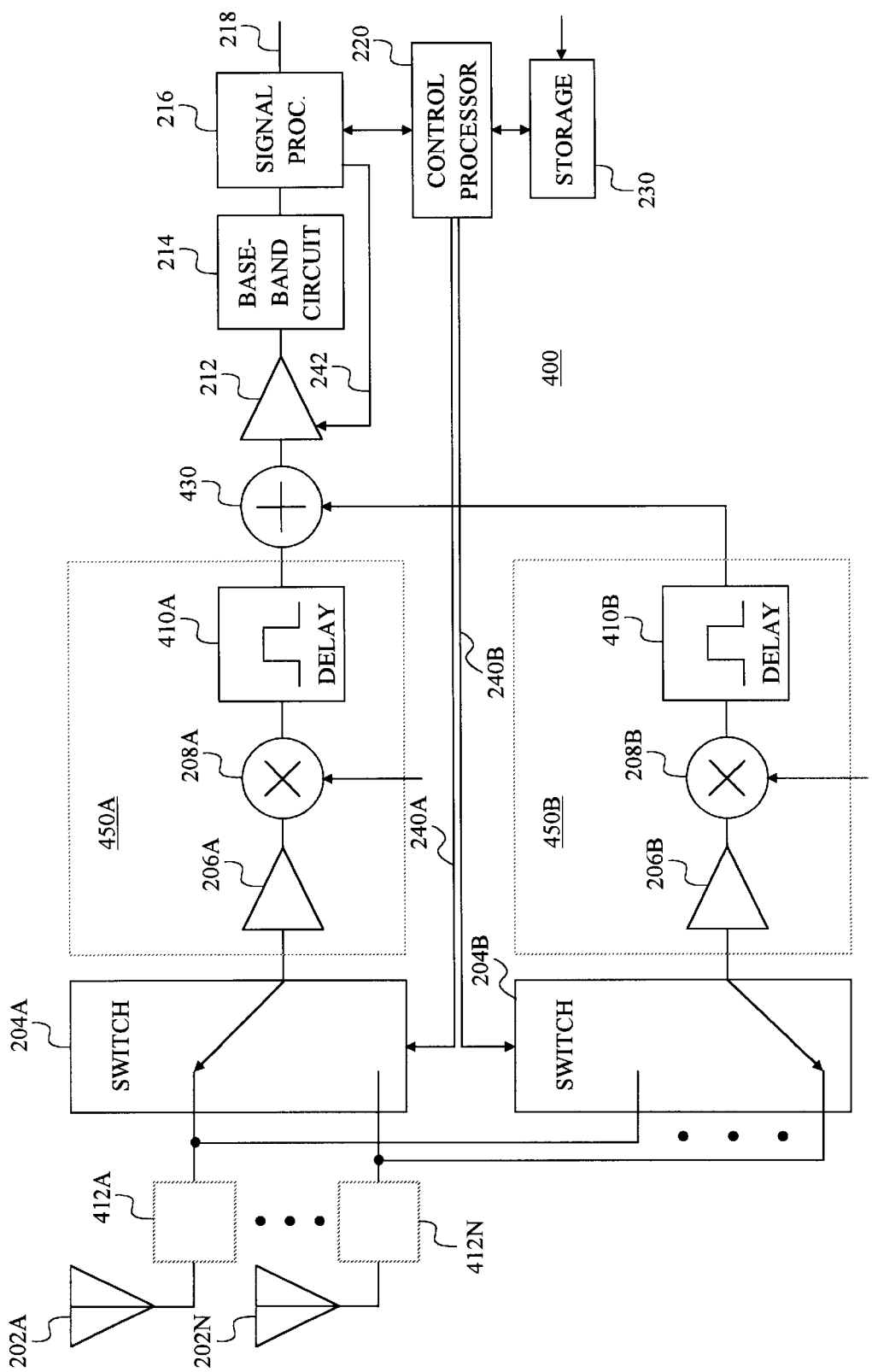
FIG. 4 is a circuit block diagram depicting an exemplary receiver system suitable for implementing a time delay searcher solution of the present invention.

FIG. 4 is a circuit block diagram depicting an exemplary receiver system 400 suitable for implementing a time delay searcher solution of the present invention. In receiver system 400, antennas 202A–202N are selectively coupled by switches 204A and 204B to two signal paths 450A and 450B, respectively. Signal paths 450A and 450B are in turn coupled by combiner 430 to an AGC amplifier 212, a baseband circuit 214, and a signal processor 216. Signal processor 216 is coupled to a control processor 220, which controls switches 204 via one or more control lines 240A and 240B. Signal path 450A includes an LNA 206A, a mixer 208A, and a bandpass filter 410A. Similarly, signal path 450B includes an LNA 206B, a mixer 208B, and a bandpass filter 410B.

In a preferred embodiment, each bandpass filter 410 (410A, 410B) includes a signal delay unit, as shown in FIG. 4. In an alternative embodiment, the signal delay may be implemented as a separate unit, as would be apparent to one skilled in the relevant art. In further embodiments, each antenna 202A–202N has a delay element 412 (412A–412N) associated with the output of the antenna, shown here in dashed outlines. Each of these delay elements has a preselected delay value associated with a single antenna, making identification possible. The delay can be selected according to expected signal parameters at the time the antenna set is designed. However, this is generally a more costly solution to implement.

The delayed signals are combined, by a combiner 430, upstream of AGC amplifier 212. By virtue of signal combination at this point, only one AGC amplifier 212 and one signal processor 216 are required to support two signal paths, resulting in substantial cost savings, reduced complexity, and increased reliability.

For accommodating the spread spectrum communication signals, signal processor 216 includes a rake receiver, which is capable of distinguishing two versions of a signal received from the same source but having different signal delays. Rake receivers for diversity reception are well known, and such a rake receiver is disclosed in the teachings of U.S. Pat. No. 5,109,390, which issued Apr. 28, 1992 under the title "*Diversity Receiver In A CDMA Cellular Telephone System*," which is assigned to the assignee of the present invention and incorporated herein by reference.

In a preferred embodiment of the present invention, the relative signal delay introduced between the search path and the data path is selected to be greater than one chip time for the PN code used to spread the signal. A wide range of delay times is possible, but delays in the range of 1.0 to 1.8 $\mu$sec appeared to work best when tested with exemplary signals and a searcher receiver used to detect and synchronize with spread spectrum signals. A PN spreading code chipping rate on the order of 1.22 MHz was used. A relative delay of 1.5 $\mu$sec was preferred for the search/data paths used in this testing.

As described above, the time delay searcher solution of the present invention has significant advantages. However, because the search path is always coupled to signal processor 216, the performance of receiver system 400 is negatively affected by signals on the search path.

VI. Time Delay Searcher with Attenuation

One way to improve the performance of the receiver system is to decouple the search path from the data path during the searching operation. One way to decouple a signal path is to employ a signal attenuator.

Figure 5:
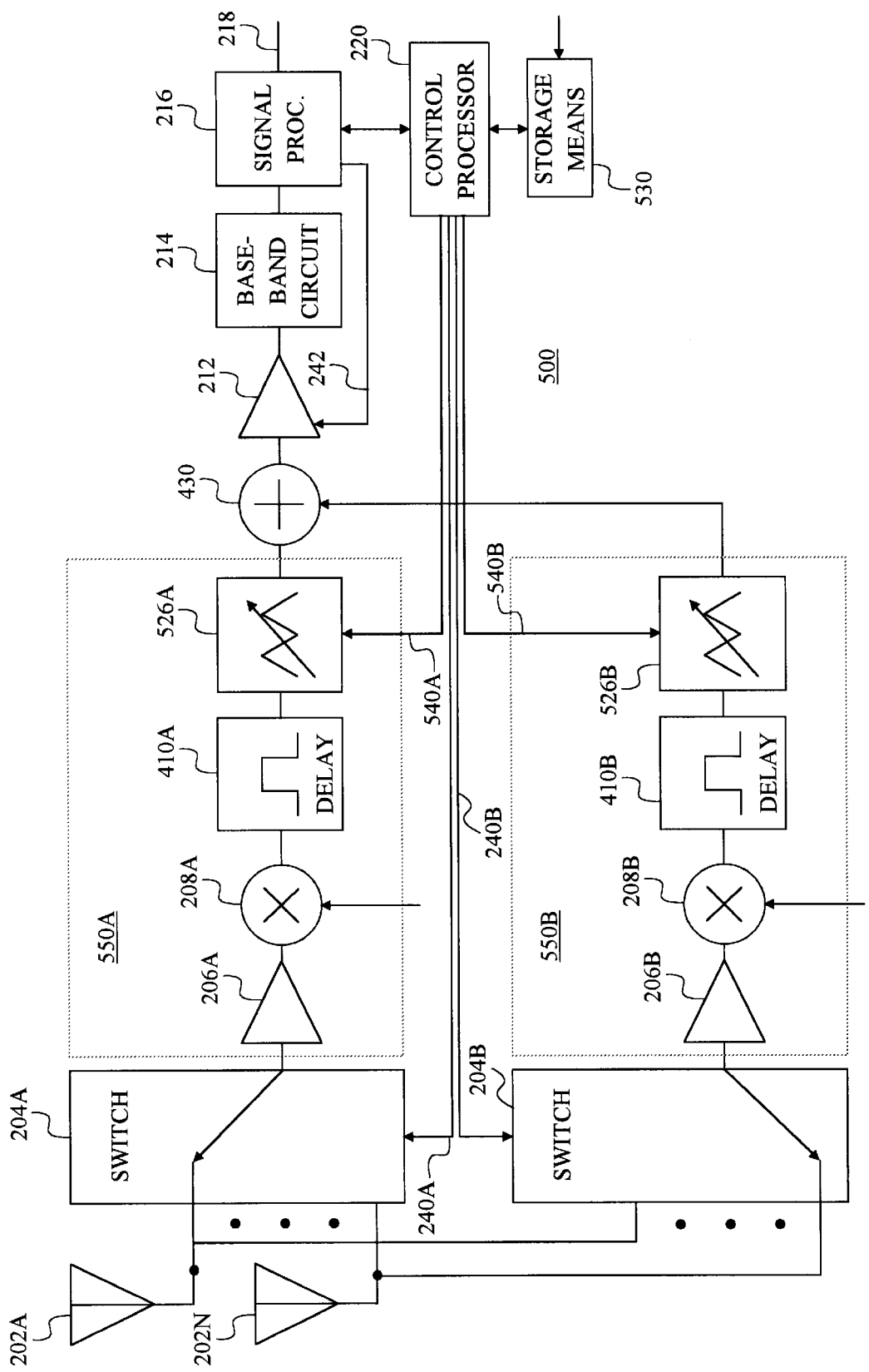
FIG. 5 depicts an exemplary receiver system suitable for implementing a time delay searcher with attenuation.

FIG. 5 depicts an exemplary receiver system 500 suitable for implementing the time delay searcher with attenuation solution of the present invention. In receiver system 500, antennas 202 are selectively coupled by switches 204A and 204B to signal paths 550A and 550B, respectively. Signal paths 550A and 550B are in turn coupled by combiner 430 to an AGC amplifier 212, a baseband circuit 214 and a signal processor 216. Signal processor 216 is coupled to a control processor 220, which controls switches 204 via one or more control lines 240 (240A, 240B). Signal path 550A includes an LNA 206A, a mixer 208A, and a bandpass filter 410A. Similarly, signal path 550B includes an LNA 206B, a mixer 208B, and a bandpass filter 410B.

In a preferred embodiment, each bandpass filter 410 (410A, 410B) includes a signal delay unit, as shown in FIG. 5. As would be apparent to one skilled in the relevant art, the signal delay can be implemented as a separate unit. In a preferred embodiment, each signal path also includes a variable attenuator 526 (VA). Each variable attenuator 526 can be configured as, and referred to as, a voltage variable attenuator (VVA). Control processor 220 controls each variable attenuator 526 (526A, 526B) via one or more control lines 540, here, 540A and 540B. Variable attenuators 526A and 526B are used to selectively couple and decouple the signal paths from signal processor 216. Because the search path can be decoupled from signal processor 216, the performance of receiver system 500 is significantly improved.

A single control line 540 can be used when only a single attenuator (VA/VVA) is used or control commands are multiplexed in a known manner so that individual attenuator control commands are detectable by each VVA (526A, 526B) connected to a common control line or bus. As discussed further below, additional attenuators or VVAs could be used where additional signal paths are being implemented.

In a preferred embodiment, the rate of attenuation change is kept below a predetermined maximum rate. This is done to prevent interference with other functions and operational characteristics of the system, such as power control, as would be apparent to one skilled in the relevant art.

The use of variable attenuators 526A and 526B also permits receiver system 500 to weight the signals presented by the two signal paths to signal processor 216. This equalization permits signal processor 216 to perform quality measurements against a common baseline, as described below.

Figure 6:
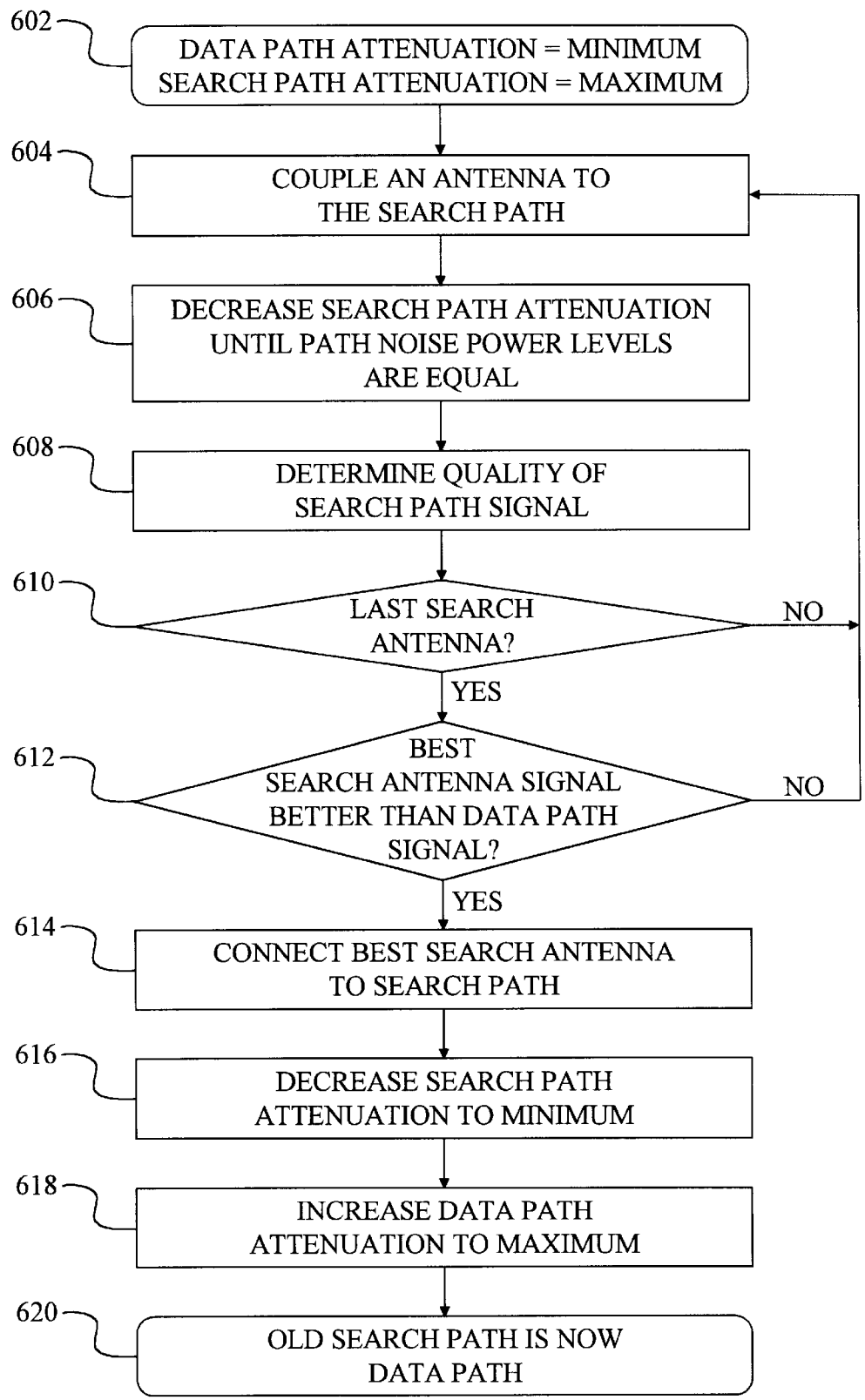
FIG. 6 is a flow chart depicting a method of operation for receiver system according to a preferred embodiment of the present invention.

FIG. 6 is a flow chart depicting a method of operation for receiver system 500 according to a preferred embodiment of the present invention. Before describing the method of operation, the initial condition of receiver system 500 is first described. Initially, the signal path acting as the data path is coupled to an antenna 202 via a switch 204 and is coupled to signal processor 216 by setting its variable attenuator 526 to a predetermined minimum attenuation. Initially, the other signal path, acting as the search path, is decoupled from antennas 202 by a switch 204 and is decoupled from signal processor 216 by setting its attenuator 526 to a predetermined maximum attenuation.

Referring to FIG. 5, assume that signal path 550A initially acts as the data path and signal path 550B initially acts as the search path. As the data path, signal path 550A is coupled to antenna 202A by switch 204A, and is coupled to signal processor 216 by setting attenuator 526A to a predetermined minimum level of attenuation, as shown in a step 602. As the search path, signal path 550B is coupled to another antenna, although it may uncoupled from any antenna, and is decoupled from signal processor 216 by setting attenuator 526B to a predetermined maximum level of attenuation, also as shown in step 602.

To initiate a search, control processor 220 commands switch 204B to couple the search path to an antenna other than the antenna coupled to the data path, as shown in a step 604. Generally, this is an antenna expected to have an improved signal at some predetermined time, according to learned or expected satellite schedules. Control processor 220 then commands search path attenuator 526B to gradually decrease the attenuation on the search path until the noise power level on the search path is roughly equivalent to the noise power level on the data path, as shown in a step 606.

The noise power level generally exceeds the signal power level in known spread spectrum systems where the noise floor dominates, such as for CDMA spread spectrum type satellite communications signals. Therefore, this weighting step provides a common baseline to signal processor 216 against which the relative quality of the signals from the data path and search path may be evaluated.

In a preferred embodiment, receiver system 500 determines that the noise power levels on the data path and search path are substantially equivalent by monitoring the change in the level of gain applied by AGC amplifier 212. This approach is preferred in systems where the noise floor dominates the received signal power. In systems with much higher signal to noise ratios, other well known techniques may also be used to detect the relative signal strength of the signals received over the search and data signal paths.

When the noise power level from the search path signal reaches the noise power level from the data path signal, then the input power received by AGC amplifier 212 is twice the input power received from the data path alone. AGC amplifier 212 responds by decreasing the gain applied to the signal by 3 dB. Thus, when control processor 220 observes that the gain applied to AGC amplifier 212 has dropped by 3 dB, then the noise power levels of the data path and search path are determined to be substantially equivalent.

In this technique, one is looking at a change in gain from an amplifier stage that is inversely proportional to the detected power. Any means of detecting power increase in signals of 3 dB can be utilized in this searching or detection scheme. In a preferred embodiment, the change in the level of gain applied by AGC amplifier 212 is determined by control processor 220 by observing a value for the gain control signal sent to AGC amplifier 212 over control line 242. Either the amplitude of analog type control signals or the number of pules per period used in PDM control signals can be used to detect the amount by which the gain of the amplifier is being changed as part of the AGC control loop. Therefore, observation of control line 242, or the commands being provided to the control lines, indicates when a 3 dB change occurs. This information is clearly available to control processor 220.

At that point, signal processor 216 evaluates the quality of the signal on the search path (that is, the signal received via the antenna coupled to the search path), as shown in a step 608. In a preferred embodiment, signal quality is determined by measuring the energy per chip ratio $E_C/I_0$. In a preferred embodiment, a measure of the signal quality is stored in a memory element, device, or storage means 530, such as RAM circuitry (not shown), for later comparison with other signal quality measurements. Receiver system 500 repeats this evaluation process for all of the remaining antennas, except the antenna connected to the data path (currently antenna 202A), as shown in a step 610. Once the signals from all of the antennas 202 have been evaluated, control processor 220 selects the highest-quality signal found and compares its quality to that of the data path signal, as shown in a step 612. If none of the found signals are of higher quality than the data path signal, then evaluation of the antennas is repeated, as shown by the arrow to step 604.

However, if the quality of the highest-quality found signal exceeds the quality of the data path signal, then the data path and search path are exchanged (that is, signal path 550A and signal path 550B exchange roles). As shown in a step 614, the antenna that was found to receive the highest-quality signal is coupled to the search path (currently signal path 550B). Then, the attenuation applied to the search path is decreased to a predetermined minimum, effectively coupling the search path to signal processor 216, as shown in a step 616. Then, as shown in a step 618, the attenuation applied to the data path (currently signal path 550A) is increased to a predetermined maximum, thus, effectively decoupling the data path from signal processor 216. Therefore, the roles of the data path and search path are smoothly reversed, with no negative impact to signal quality.

Searching can then continue for as long as desired. Generally, searching occurs as long as the wireless device using the antennas is active (communicating or paging) and other signals are to be detected and potentially used. The searching is typically terminated by deactivation of the wireless device (hanging up or unable to establish call), or by a determination that there are no better signals available over some period of time. Those skilled in the communication system art are aware of criteria used to terminate searching.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What we claim as the invention is:

1. A system for selecting antennas in a satellite communications system having a satellite transmitting a signal and a user terminal having a plurality of antennas, the system for selecting the antennas, comprising:

a first signal path coupled to a first one of the plurality of antennas;

a second signal path coupled to a second one of the plurality of antennas, said second signal path including a signal delay unit; and a signal processor coupled to said first and second signal paths that distinguishes a signal received from the satellite by said first one of the plurality of antennas from the signal received from the satellite by said second one of the plurality of antennas based on a signal delay produced by said signal delay unit.

2. The system of claim 1, wherein said first signal path comprises a further signal delay unit.

3. The system of claim 1, wherein said first signal path includes a first variable attenuator.

4. The system of claim 3, wherein said second signal path includes a second variable attenuator.

5. The system of claim 4, further comprising:

a control processor that determines the quality of the signal received by said first one of the plurality of antennas and the signal received by said second one of the plurality of antennas and generates at least one antenna selection output; and said first and second variable attenuators are connected to receive said control processor selection output so as to selectively couple said first and second signal paths to said signal processor based on said determined quality.

6. The system of claim 5, wherein said received signals comprise chips and said quality is determined based on energy per chip.

7. The system of claim 5, further comprising a first switch disposed between the plurality of antennas and the first signal path, coupled to said control processor, and operable to selectively couple one of the plurality of antennas to said first signal path based on said selection output by said control processor.

8. The system of claim 7, further comprising a second switch disposed between the plurality of antennas and the second signal path, coupled to said control processor, and operable to selectively couple one of the plurality of antennas to said second signal path based said selection output by said control processor.

9. The system of claim 1 further comprising at least a third signal path coupled to a third one of the plurality of antennas, and said signal processor with further signal delay units disposed in series therewith, said signal processor distinguishing the signal received from the satellite by said first, second, and third or more ones of the plurality of antennas based on a signal delay produced by said signal delay units.

10. A method of selecting antennas for use in a satellite communications system having a satellite transmitting a signal and a user terminal having a plurality of antennas, wherein each of the plurality of antennas can be selectively coupled to one of a plurality of signal paths, the signal paths coupled to a signal processor, wherein a first one of the signal paths initially receives the signal on a first one of the plurality of antennas and initially applies a predetermined minimum level of attenuation to the signal, the method of selecting the antennas, comprising the steps of:

applying a predetermined maximum level of attenuation on a second one of the signal paths;

coupling a second one of the plurality of antennas to said second signal path;

decreasing the level of attenuation applied on said second signal path until the noise power level on said second signal path is substantially equivalent to the noise power level on the first signal path; and when the quality of the signal received from the satellite by said second one of the plurality of antennas exceeds the quality of the signal received from the satellite by the first one of the plurality of antennas, applying said predetermined maximum level of attenuation on the first signal path and applying the predetermined minimum level of attenuation on said second signal path.

11. The method of claim 10, further comprising the steps of:

delaying the signal received from the satellite by said second one of the plurality of antennas by a predetermined signal delay; and distinguishing the signal received from the satellite by said first one of the plurality of antennas from the signal received on said second one of the plurality of antennas based on said predetermined signal delay.

12. The method of claim 10, further comprising the step of determining the quality of the signal received from the satellite by said second one of the plurality of antennas and the quality of the signal received from the satellite by the first one of the plurality of antennas.

13. The method of claim 10, further comprising the step of determining the quality of the signal received from the satellite by said second one of the plurality of antennas and the quality of the signal received from the satellite by the first one of the plurality of antennas based on a signal to noise ratio.

14. The method of claim 13 wherein said received signals comprise chips and said signal to noise ratio is determined from an energy per chip of the received signal relative to signal noise.

15. The method of claim 10, further comprising the steps of:

applying an automatic gain control (AGC) operation between said first and second signal paths and said signal processor; and monitoring the level of gain applied by said AGC operation.

16. The method of claim 15, wherein said decreasing step further comprises the step of determining when the level of gain applied by said AGC decreases by a predetermined amount.

17. The method of claim 16 wherein said predetermined amount is 3 dB.

18. The method of claim 10, further comprising the steps of:

delaying the signal received from the satellite by at least a third one of the plurality of antennas by another predetermined signal delay, for each other antenna; and distinguishing the signal received from the satellite by said first, second and third, or more, ones of the plurality of antennas based on said predetermined signal delays.

19. A system for selecting antennas based on received signal quality in a satellite communications system having a satellite transmitting a signal and a user terminal having a plurality of antennas for receiving signals, comprising:

a first signal path coupled to a first one of the plurality of antennas;

a second signal path coupled to a second one of the plurality of antennas;

at least one signal delay unit connected in series with said second signal path;

a first signal processor coupled to said first signal path;

a second signal processor coupled to said second signal path; and a control processor, coupled to said first and second signal processors, that determines a relative quality of the signal on said first signal path and the signal on said second signal path and selects the one of the first and second ones of the plurality of antennas that receives the signal of higher quality.

20. The system of claim 19, further comprising at least a second signal delay unit connected in series with said first signal path.

21. The system of claim 19 further comprising at least a third signal path coupled to a third one of the plurality of antennas, and a third signal processor coupled to said third signal path and said control processor.

22. The system of claim 21, further comprising at least a third signal delay unit connected in series with said first signal path.

* * * * *